(12) United States Patent
Olson et al.

(10) Patent No.: US 11,317,612 B2
(45) Date of Patent: May 3, 2022

(54) FISHING CAPTURE LURE

(71) Applicant: Olson IP Technologies, Inc., Mundelein, IL (US)

(72) Inventors: Richard Carl Olson, Deerfield Beach, FL (US); Erik Olson, Deerfield Beach, FL (US)

(73) Assignee: Olson IP Technologies, Inc., Mundelein, IL (US)

( * ) Notice: Subject to any disclaimer, the term of this patent is extended or adjusted under 35 U.S.C. 154(b) by 214 days.

(21) Appl. No.: 16/291,178

(22) Filed: Mar. 4, 2019

(65) Prior Publication Data

US 2019/0269113 A1 Sep. 5, 2019

Related U.S. Application Data

(60) Provisional application No. 62/637,849, filed on Mar. 2, 2018.

(51) Int. Cl.
*A01K 85/10* (2006.01)

(52) U.S. Cl.
CPC .................... *A01K 85/10* (2013.01)

(58) Field of Classification Search
CPC ........ A01K 83/06; A01K 83/04; A01K 83/02; A01K 85/10; A01K 85/00; A01K 83/00; A01K 99/00; A01K 97/045
USPC ..... 43/42.19, 17.6, 42.05, 43.16, 44.2, 44.8, 43/41, 44.4, 44.6, 42.38
See application file for complete search history.

(56) References Cited

U.S. PATENT DOCUMENTS

| | | | |
|---|---|---|---|
| 1,114,698 A | * | 10/1914 | Lane ........................ A01K 83/06 43/44.4 |
| 1,333,154 A | | 3/1920 | Buddle |
| 1,418,229 A | | 5/1922 | Buddle |
| 1,948,005 A | | 2/1934 | Pflueger |
| 2,005,554 A | | 6/1935 | Milner |
| 2,257,403 A | * | 9/1941 | Vandine .................. A01K 83/06 43/44.6 |
| 2,290,433 A | | 7/1942 | Jeffers |
| 2,402,730 A | * | 6/1946 | Bucks ..................... A01K 83/06 43/44.4 |
| 2,499,718 A | | 3/1950 | Boshears |
| 2,523,949 A | | 9/1950 | Gambill |
| 2,575,626 A | | 11/1951 | Isaac |

(Continued)

FOREIGN PATENT DOCUMENTS

| JP | H10108591 | 4/1998 |
|---|---|---|
| WO | 2015153941 | 10/2015 |

OTHER PUBLICATIONS

"Pictures of CableCuff Pro®." The cable clamp being publicly available before Oct. 2015, 4 pages.

*Primary Examiner* — Peter M Poon
*Assistant Examiner* — Jeffrey R Larsen
(74) *Attorney, Agent, or Firm* — Fitch, Even, Tabin & Flannery LLP

(57) ABSTRACT

In accordance with one aspect of the present disclosure, a fishing lure is provided that includes a body having an opening to receive a fish and at least one hook connected to the body. The body includes capture portions having a spaced apart, open configuration that permits fish to be positioned in the opening of the body and a closer, closed configuration wherein the capture portions capture the fish in the opening of the body.

17 Claims, 16 Drawing Sheets

(56) References Cited

U.S. PATENT DOCUMENTS

| | | | | |
|---|---|---|---|---|
| 2,588,526 | A | * | 3/1952 | Hoage .................. A01K 83/06 43/44.6 |
| 2,608,016 | A | | 8/1952 | Shipley |
| 2,694,876 | A | | 11/1954 | Grasser |
| 2,694,877 | A | | 11/1954 | Wise |
| 2,755,593 | A | * | 7/1956 | Thurman ............... A01K 83/06 43/44.2 |
| 2,767,503 | A | | 10/1956 | Fisher |
| 2,927,392 | A | | 3/1960 | Lievense |
| 3,040,467 | A | * | 6/1962 | Norton .................. A01K 85/00 43/42.29 |
| 3,289,346 | A | * | 12/1966 | Ehling .................. A01K 83/06 43/44.6 |
| 3,388,495 | A | | 6/1968 | Minser |
| 3,462,871 | A | | 8/1969 | McVay |
| 3,727,339 | A | | 4/1973 | Le Master |
| 3,744,175 | A | | 7/1973 | Bellah |
| 3,760,529 | A | * | 9/1973 | Hicks .................... A01K 83/06 43/41 |
| 3,769,739 | A | | 11/1973 | Pitts |
| 3,841,012 | A | | 10/1974 | Maled |
| 3,902,267 | A | | 9/1975 | Monchil |
| 3,950,882 | A | | 4/1976 | Monchil |
| 3,999,324 | A | | 12/1976 | Wagner |
| 4,141,171 | A | | 2/1979 | Muddiman |
| 4,155,191 | A | | 5/1979 | Spivey |
| 4,155,192 | A | | 5/1979 | Varaney |
| 4,215,507 | A | | 8/1980 | Russell |
| 4,223,469 | A | | 9/1980 | Luz |
| 4,468,880 | A | | 9/1984 | Olszewski |
| 4,562,661 | A | | 1/1986 | Messinger |
| 4,697,378 | A | | 10/1987 | Tunstall |
| 4,731,948 | A | | 3/1988 | Helton |
| 4,738,047 | A | | 4/1988 | Ryan |
| 4,742,638 | A | | 5/1988 | Vobejda |
| 4,777,761 | A | | 10/1988 | Renaud |
| 4,807,387 | A | | 2/1989 | Dougherty, Jr. |
| 4,862,629 | A | | 9/1989 | Ryan |
| 4,870,776 | A | | 10/1989 | Schock |
| 5,115,592 | A | | 5/1992 | Renaud |
| 5,216,830 | A | | 6/1993 | Brott, II |
| 5,218,778 | A | | 6/1993 | Szantor |
| 5,329,721 | A | | 7/1994 | Smith |
| 5,337,508 | A | | 8/1994 | Pfeiffer |
| 5,566,496 | A | | 10/1996 | Rutherford |
| 5,600,916 | A | | 2/1997 | Smith |
| 5,829,183 | A | | 11/1998 | Guerin |
| D405,497 | S | | 2/1999 | Phelps |
| 5,937,569 | A | | 8/1999 | Solheim |
| 6,101,684 | A | | 8/2000 | Ginocchio |
| 6,101,758 | A | | 8/2000 | Finley |
| 6,385,896 | B1 | | 5/2002 | Thomassin |
| 6,484,434 | B1 | | 11/2002 | Elges |
| 6,804,910 | B1 | | 10/2004 | Sharp |
| 6,931,784 | B1 | | 8/2005 | Sutherland |
| 7,316,095 | B1 | | 1/2008 | Petner |
| 7,621,068 | B1 | | 11/2009 | Renosky |
| 8,028,464 | B2 | | 10/2011 | Smith |
| 8,146,288 | B2 | | 4/2012 | Barczak |
| 8,438,776 | B2 | | 5/2013 | Tsai |
| D692,520 | S | | 10/2013 | Vainio |
| 8,720,104 | B2 | | 5/2014 | Smith |
| D713,924 | S | | 9/2014 | Vainio |
| D713,927 | S | | 9/2014 | Albanese |
| D767,080 | S | | 9/2016 | Vainio |
| 9,456,593 | B2 | | 10/2016 | Mcwilliams |
| 9,572,331 | B1 | | 2/2017 | Reyment |
| D781,995 | S | | 3/2017 | Evans, Jr. |
| D837,932 | S | | 1/2019 | Brink |
| 10,470,447 | B2 | | 11/2019 | Takahashi |
| 2002/0050090 | A1 | | 5/2002 | Lloyd |
| 2002/0121043 | A1 | | 9/2002 | Hawkins |
| 2004/0006909 | A1 | | 1/2004 | Essad |
| 2004/0107626 | A1 | | 6/2004 | Sims |
| 2005/0086849 | A1 | | 4/2005 | Perrick |
| 2005/0246940 | A1 | | 11/2005 | Jones |
| 2007/0163165 | A1 | | 7/2007 | Castro |
| 2007/0283613 | A1 | | 12/2007 | Woller |
| 2008/0010893 | A1 | | 1/2008 | Polachek |
| 2008/0104877 | A1 | | 5/2008 | Claverie, III |
| 2008/0104881 | A1 | | 5/2008 | Ito |
| 2009/0183418 | A1 | | 7/2009 | Dahlberg |
| 2010/0212124 | A1 | | 8/2010 | Denton |
| 2010/0223833 | A1 | | 9/2010 | Rigney |
| 2011/0010984 | A1 | | 1/2011 | Reynolds |
| 2011/0047856 | A1 | | 3/2011 | Gustafsson |
| 2011/0247260 | A1 | | 10/2011 | Schwartz |
| 2011/0258906 | A1 | | 10/2011 | Ford |
| 2011/0296737 | A1 | | 12/2011 | Peluso |
| 2012/0144723 | A1 | | 6/2012 | Davidson |
| 2012/0167446 | A1 | | 7/2012 | Vladlenovich |
| 2012/0317864 | A1 | | 12/2012 | Vanacore, Jr. |
| 2015/0082682 | A1 | | 3/2015 | Vashina |
| 2015/0282464 | A1 | | 10/2015 | Brink |
| 2015/0342166 | A1 | | 12/2015 | Mcwilliams |

\* cited by examiner

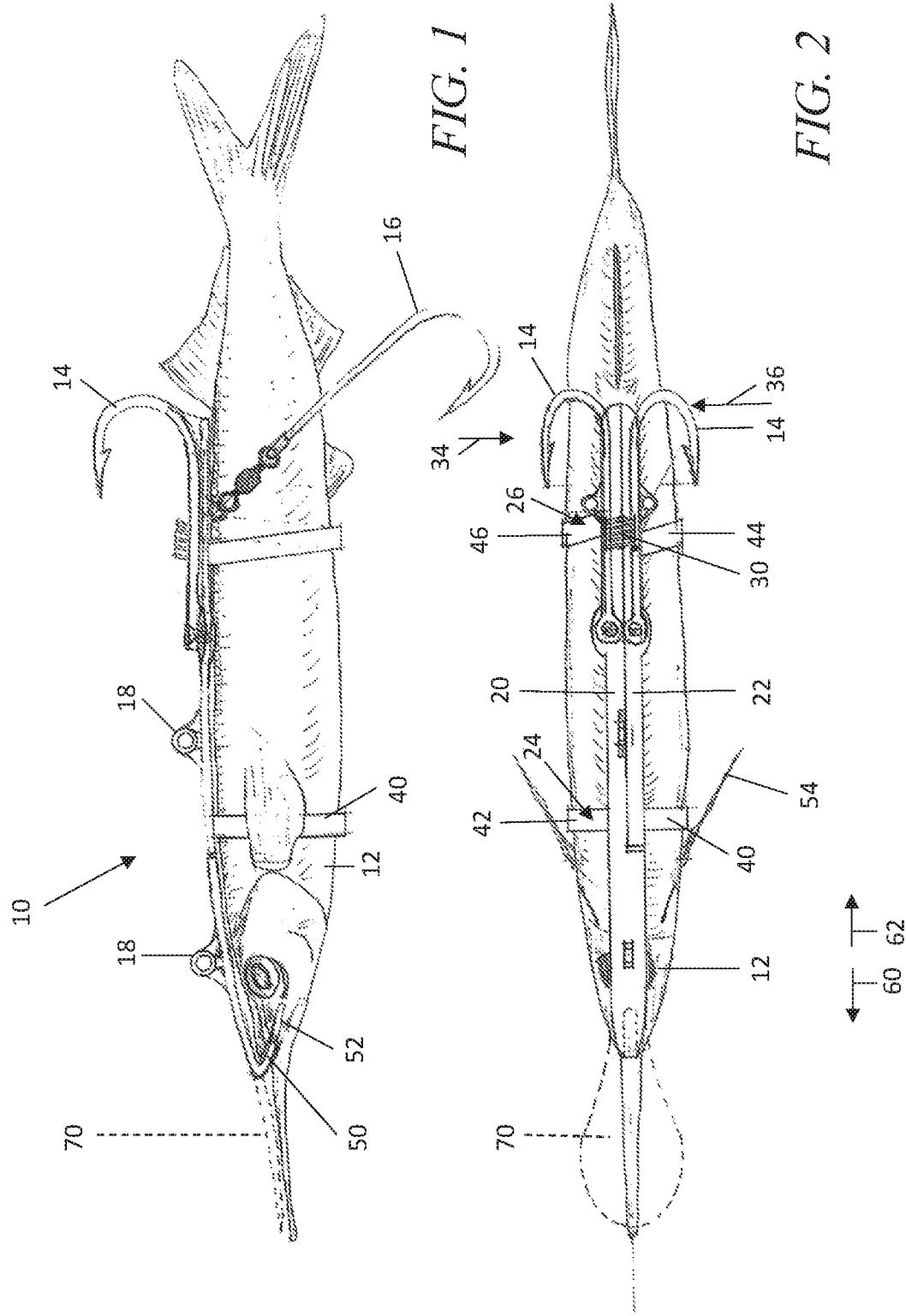

FISHING CAPTURE LURE

CROSS-REFERENCE TO RELATED APPLICATION

This application claims the benefit of U.S. Provisional Application No. 62/637,849, filed Mar. 2, 2018, which is incorporated herein by reference in its entirety.

FIELD

This disclosure relates to fishing lures and, more specifically, to fishing lures for predator game fish.

BACKGROUND

A common approach for attaching bait to a fishing line is by penetrating or skewering live or dead prey fish-bait onto a hook attached to a fishing line. This can be done with one, two, or several hook penetrations for bait. This process is often difficult and, when the bait is live, more difficult.

BRIEF DESCRIPTION OF THE DRAWINGS

FIG. 1 is a side elevational view of a fishing capture lure holding a live bait fish;

FIG. 2 is a top plan view of the capture lure of FIG. 1 showing a spring of the capture lure that biases capture bodies of the capture lure around the fish;

DETAILED DESCRIPTION

Figure 3:
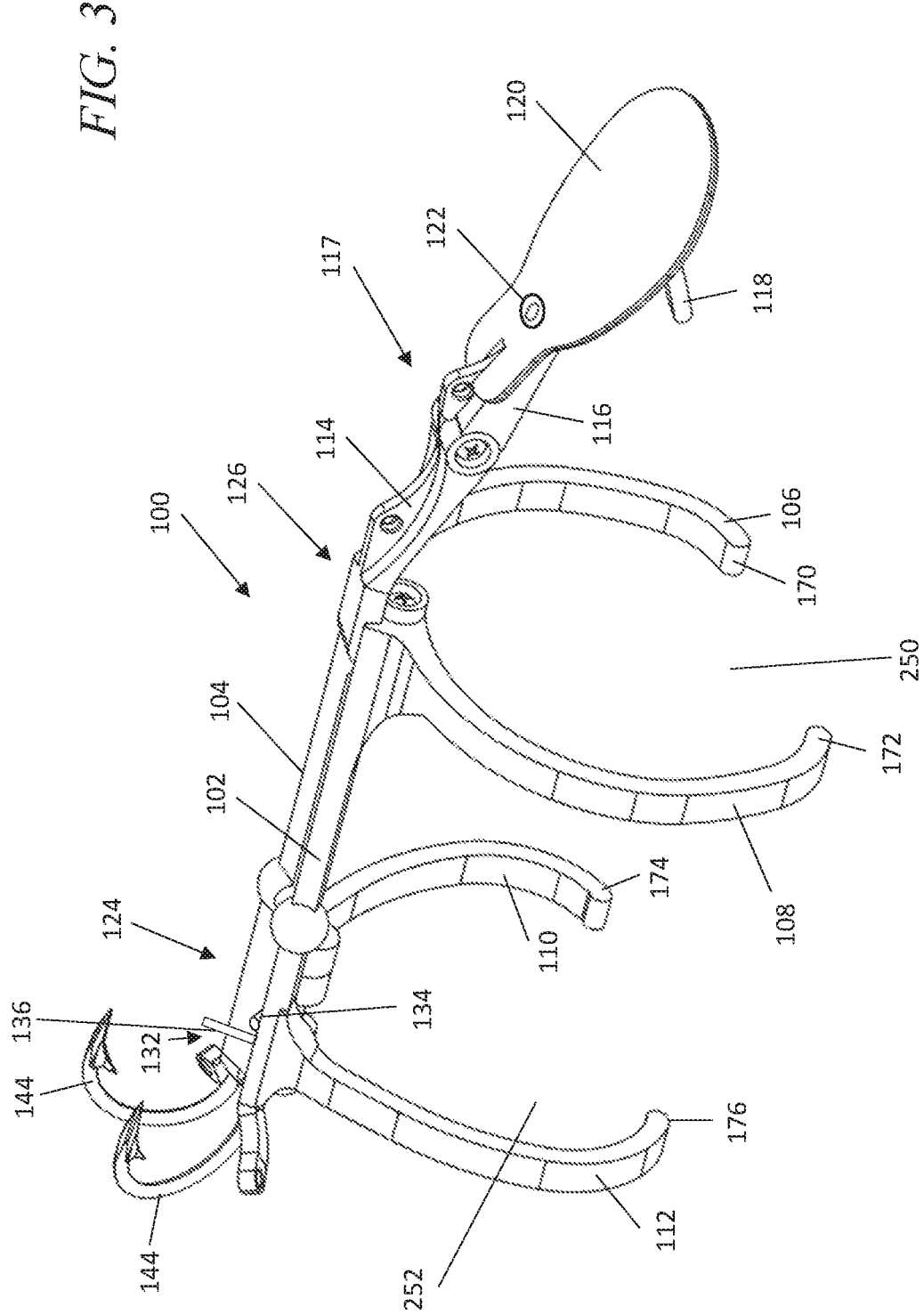
FIG. 3 is a perspective view of a capture lure similar to the capture lure of FIG. 1 showing capture bodies of the capture lure in an open configuration.

With reference to FIG. 1, a capture lure 10 is provided that captures a bait fish 12 and has one or more primary hooks 14 and optionally one or more secondary hooks 16 for catching a predator game fish. The capture lure 10 can be engaged with a live bait fish 12 without injuring or killing the bait fish 12. Thus, when the capture lure 10 and bait fish 12 are placed into the water, the bait fish 12 can swim and has generally the same appearance to a predator game fish as if the bait fish 12 were swimming freely. This unencumbered movement of the bait fish 12 increases the desirability of the bait fish 12 to predator game fish. The bait fish 12 also lives longer than if the bait fish 12 were skewered with a hook. Further, the fisherman does not have to skewer the bait fish 12 with a hook which improves ease of use and avoids the bait fish 12 bleeding on the fisherman and/or his boat. The capture lure 10 may also be used with a dead bait fish 12 and is easier to use than some prior approaches because the fisherman does not have to skewer the bait fish 12 to connect the capture lure 10 to the bait fish 12.

The capture lure 10 includes one or more fishing line connection portions, such as eyelets 18, for being connected to a fishing line. The capture lure 10 includes a body, such as a pair of capture bodies 20, 22, which are connected to each other at a front hinge connection 24 and at a rear hinge connection 26. The front hinge connection 24 and the rear hinge connection 26 define a pivot axis about which the capture bodies 20, 22 can pivot relative to each other. The capture lure 10 includes one or more biasing members, such as a spring 30, that biases the capture bodies 20, 22 together and around the fish 12 so that the capture bodies 20, 22 tightly grasp the fish 12 therebetween. The capture bodies 20, 22 include capture portions, such as inner surfaces of arms 40, 42 and 44, 46, for clamping or gripping the fish 12.

To apply the capture lure 10 to the fish 12, a user manually draws the primary hooks 14 together generally in directions 34, 36 against the bias of the spring 30. This pivots the arms 40, 42 and 44, 46 thereof apart so that the fish 12 may be inserted therebetween. Once the fish 12 has been positioned between the arms 40, 42 and 44, 46, the user releases the primary hooks 14 and the spring 30 urges the arms 40, 42 and 44, 46 together to clamp the fish 12 therebetween. The capture lure 10 permits one-handed application of the capture lure 10 to the fish 12. More specifically, the user holds the fish 12 in one hand and brings the primary hooks 14 together in directions 34, 36 to open the capture lure 10 with the user's other hand. The user then places the capture lure 10 onto the fish 12. Because the user can have one hand holding the fish 12 and the other hand holding the capture lure 10, the user can firmly grip both the capture lure 10 and the fish 12 and control the assembly process even when the fish 12 is alive and moving.

The capture lure 10 includes a bit, such as a tab 50, that is inserted into a mouth 52 of the fish 12. The arms 40, 42 are positioned behind pectoral fins 54 of the fish 12. The tab 50 resists movement of the fish 12 in direction 60 relative to the capture lure 10 and the arms 40, 42 resist movement of the fish 12 in direction 62 relative to the capture lure 10. The capture bodies 20, 22 may also define therebetween a slot (see e.g., a slot 66 in FIG. 6) sized to receive a dorsal fin of the fish 12. The capture bodies 20, 22 thereby both clamp onto the fish 12 and utilize the fins and mouth of the fish 12 to inhibit release of the fish 12 from the capture lure 10.

The capture lure 10 may also include a bill 70 connected to the capture bodies 20, 22. The bill 70 controls the position and/or swim characteristics of the capture lure 10 and fish 12 as the capture lure 10 and fish 12 are moved through water.

With reference to FIG. 3, a capture lure 100 is provided that is similar in many respects to the capture lure 10 discussed above. Thus, the following description of the components of the capture lure 100 and its operation is intended to inform the reader regarding similar components and their operation of the capture lure 10.

The capture lure 100 includes a body, such as capture bodies 102, 104, having arms 106, 108 and 110, 112. The capture lure 100 further includes a bridle for engaging the mouth of a fish, such as a connector 114 and a retainer 116 that are joined by a hinge connection 117. The connector 114 and the retainer 116 extend forward of the capture bodies 102, 104 and the retainer 116 includes a bit, such as a tab portion 118. The hinge connection 117 permits adjustment of the retainer 116 relative to the connector 114 and permits the capture lure 100 to accommodate different varieties of bait fish.

Figure 4:
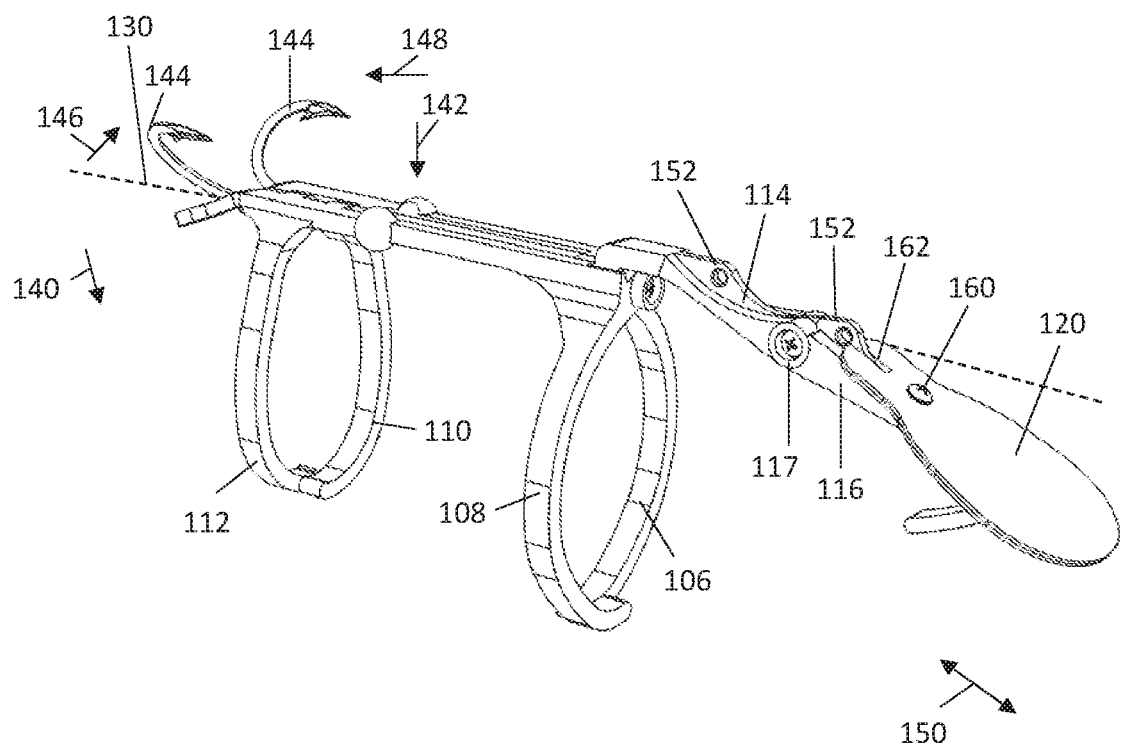
FIG. 4 is a perspective view similar to FIG. 3 showing the arms of the capture lure in a closed configuration.

With reference to FIG. 4, the capture lure 100 may also include a bill 120 connected to the retainer 116 by a fastener 122. The bill 120 may be shaped to control the depth the capture lure 100 and fish captured therein travel as the capture lure 100 is moved through water such as being pulled by a fisherman or pulled behind a boat. For example, the connector 114 and the retainer 116 include eyelets 152 to which a fishing line may be connected and used to pull the capture lure 100 through the water. The bill 120 is connected to the retainer 16 by a fastener such as a screw 160 that extends through an opening of the bill 120. The bill 120 may also include an alignment slot 162 that receives one of the eyelets 152. The engagement between the alignment slot 162 and the eyelet 152 resists turning of the bill 120 relative to the screw 160.

The capture lure 100 includes one or more pivot connections, such as a rear hinge connection 124 and a front hinge connection 126, that permit the capture bodies 102, 104 to pivot between an open configuration (see FIG. 3) and a closed configuration (see FIG. 4) about a pivot axis 130 defined by the front and rear hinge connections 126, 124. The rear hinge connection 124 includes a spring 132 (see FIG. 11) having legs 134, 136 (see FIG. 3) that urge the capture bodies 102, 104 in directions 140, 142 about the pivot axis 130. To open the arms 106, 108 and 110, 112, the user urges hooks 144 together in directions 146, 148 which pivots the capture bodies 102, 104 in directions 146, 148 about the pivot axis 130. The hooks 144 are fixed to the capture bodies 102, 104 such that the user's movement of the hooks 144, 146 in directions 146, 148 causes the hooks 144 to pivot the capture bodies 102, 104 about the axis 130.

Figure 5:
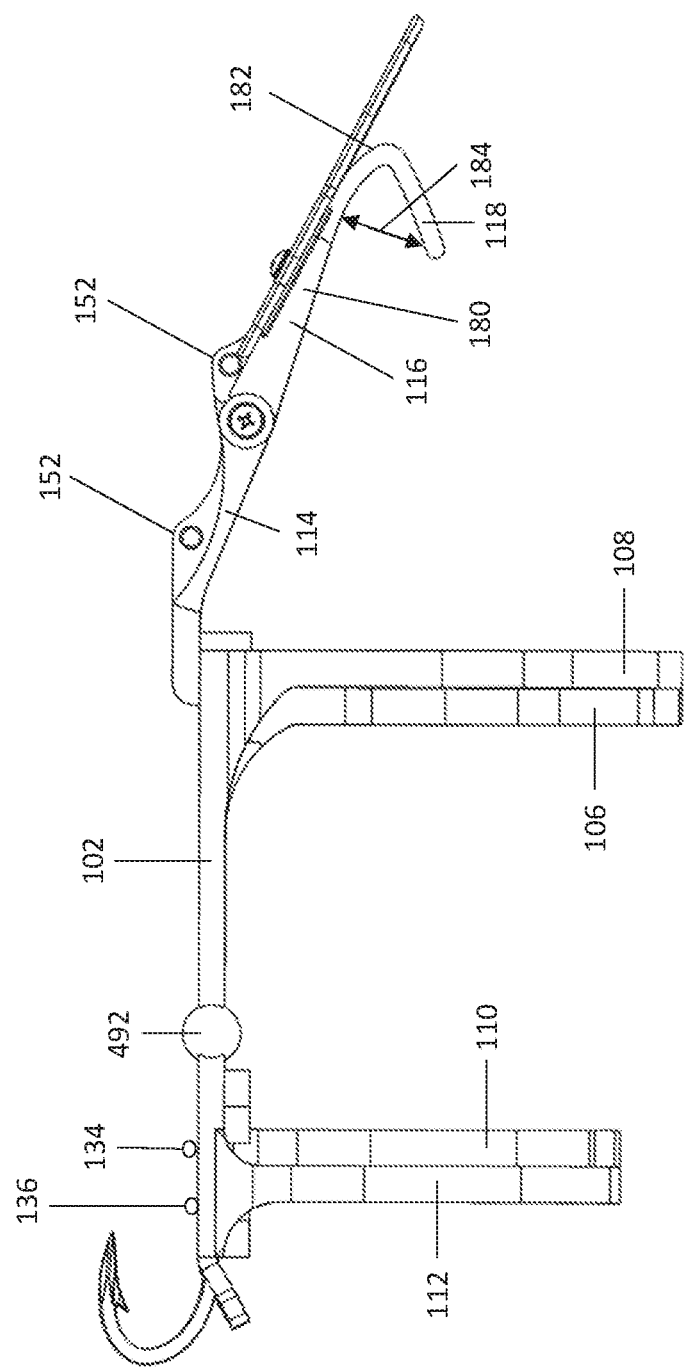
FIG. 5 is a side elevational view of the fishing lure of FIG. 3 showing a hooked retainer having a tab portion for inserting into the mouth of a fish.

With reference to FIG. 5, the arms 106, 108 and 110, 112 are axially offset so that end portions 170, 172 and 174, 176 (see FIG. 3) may overlap when viewed from the front or rear of the capture lure 100. The overlapping relationship of the arm end portions 170, 172 and 174, 176 allows the capture lure 100 to engage fish of different thicknesses and will be discussed in greater detail below with respect to FIGS. 7 and 8. For example, for larger fish, the arm portions 170, 172 and 174, 176 will overlap less or not at all while, for smaller fish, the arm portions 170, 172 and 174, 176 will overlap.

Regarding FIG. 5, the retainer 116 includes a base 180, an elbow 182, and a tab 118 that is oriented to extend at an angle 184 relative to the base 180. The angle 184 is in the range of approximately 33 degrees to approximately 47 degrees. The tab 118 is arranged to fit into the mouth of a fish held by the capture lure 100.

Figure 6:
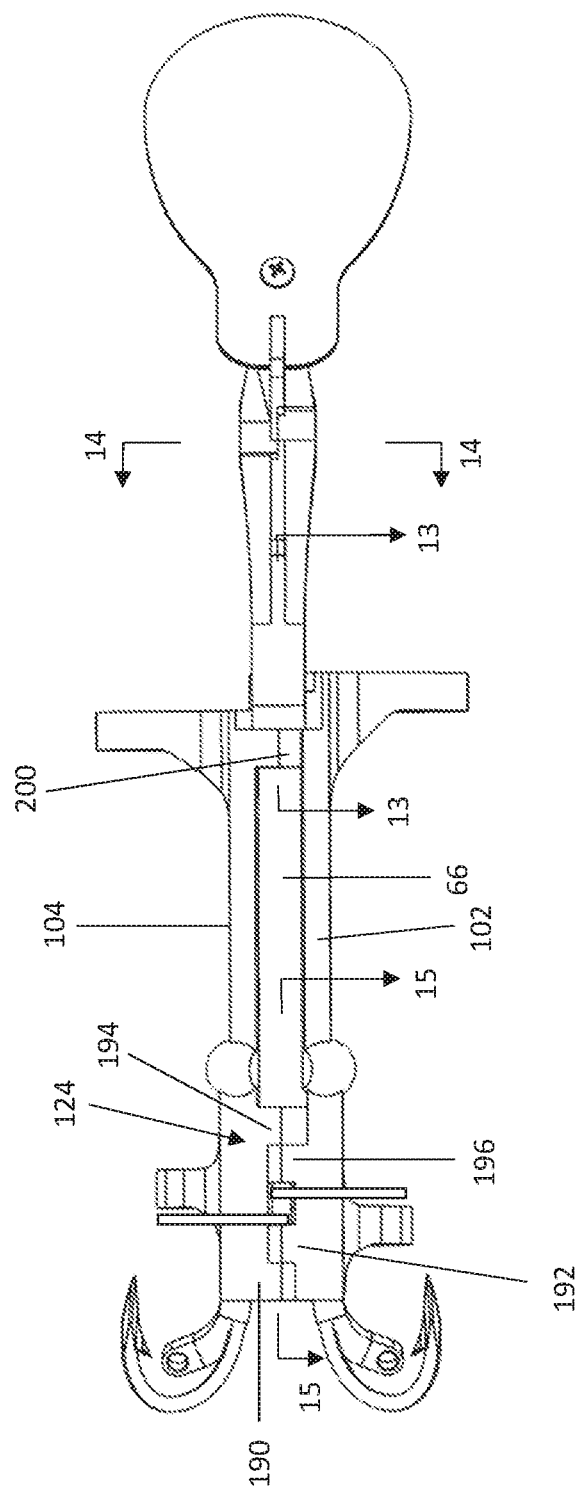
FIG. 6 is a top plan view of the capture lure of FIG. 3 showing an elongated slot for receiving a dorsal fin of a fish.
Figure 11:
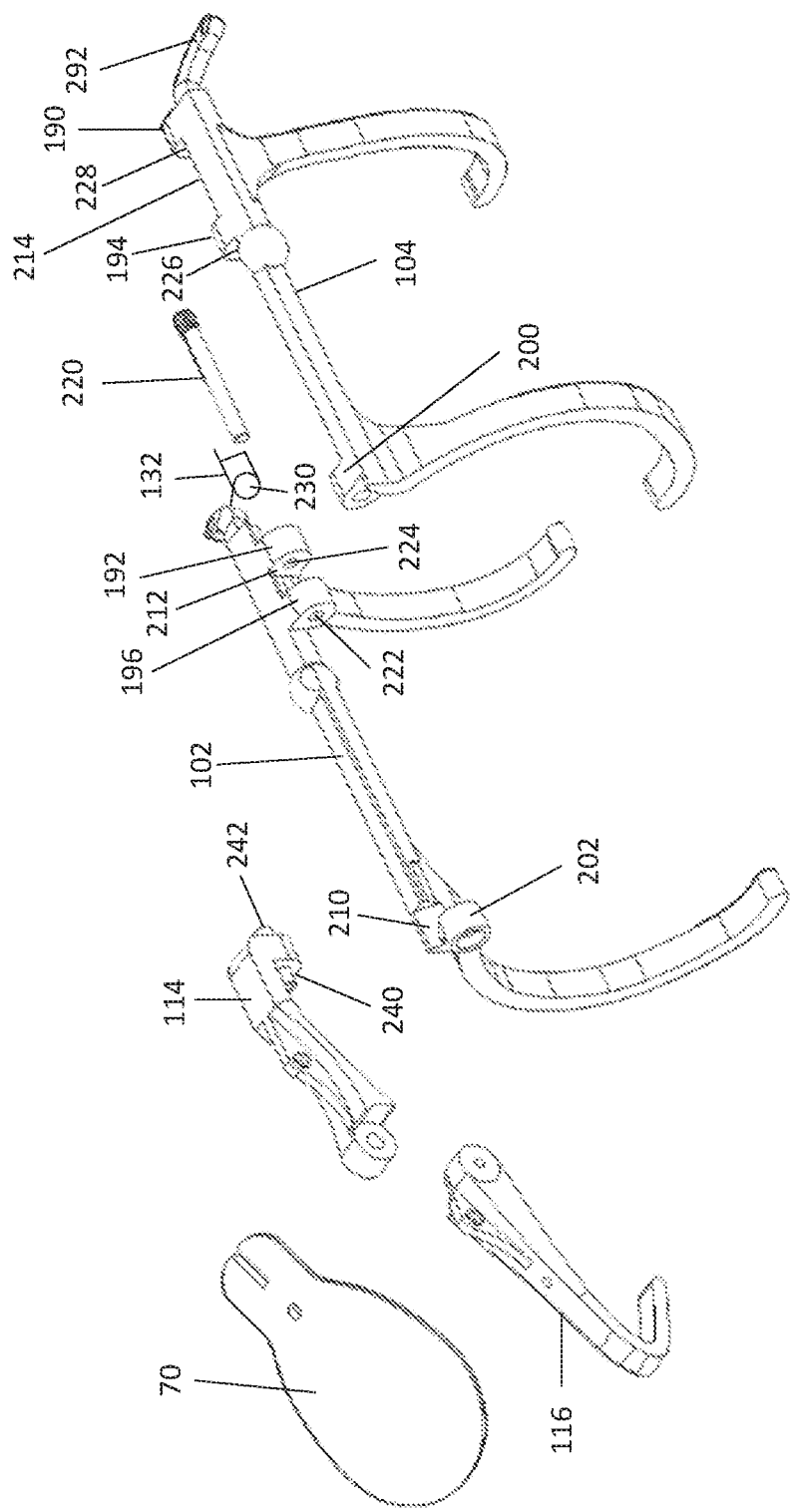
FIG. 11 is an exploded view of the capture lure of FIG. 3.

Turning to FIG. 6, the capture bodies 102, 104 include interlocking knuckles or loops 190, 192 and 194, 196 at the rear hinge connection 124. The capture bodies 102, 104 include laced loops 200, 202 at the front hinge connection 126 as shown in FIG. 11. The capture body 102 includes a recess 210 that receives at least a portion of the connector 114 and a recess 212 that receives a portion of the spring 132 (see FIG. 11). The capture body 104 includes a recess 214 that receives at least a portion of the loops 192, 196 and a portion of the spring 132. The rear hinge connection 124 includes a pivot member, such as hinge pin 220, that extends through openings 222, 224, 226, 228 of the pairs of loops 194, 196 and 190, 192 as well as through a central opening 230 (see FIG. 11) of the spring 132 to form a hinge between the capture bodies 102, 104. As discussed in greater detail below, the loops 200, 202 are joined together by fasteners 344, 376 that engage bosses 240, 242 of the connector 114 and form the front hinge connection 126 between the capture bodies 102, 104 and the connector 114.

Figure 7:
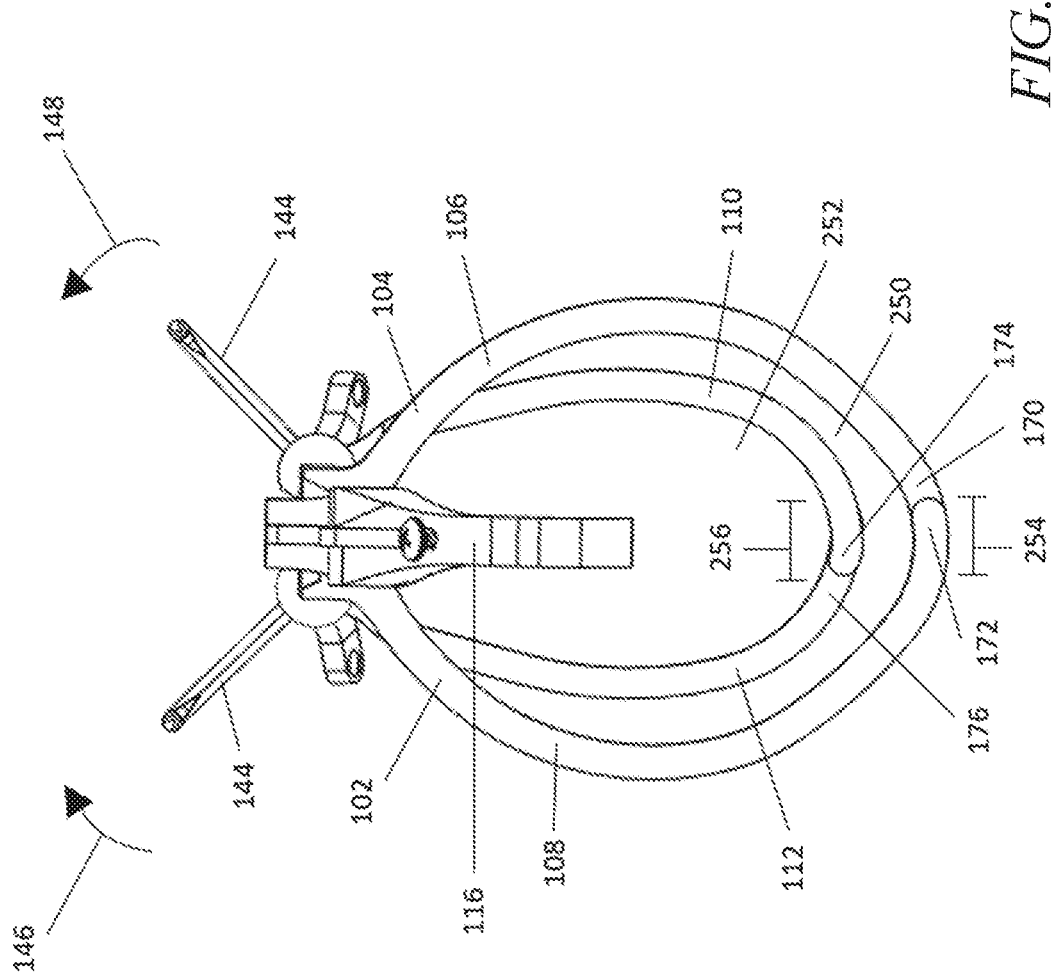
FIG. 7 is a front elevational view of the capture lure of FIG. 3 showing ends of the arms overlapping when the arms are in the closed configuration.

With reference to FIG. 7, the capture lure 100 is shown with the arms 106, 108 and 110, 112 in the closed configuration and with the bill 120 removed. To pivot the arms 106, 108 and 110, 112 to the open configuration, the user urges the hooks 144 together in directions 146, 148 with the user's fingers to pivot the arms 106, 108 and 110, 112 also in directions 146, 148 to the open position as shown in FIG. 8.

When the arms 106, 108 and 110, 112 are in the closed configuration thereof, the arms 106, 108 and 110, 112 form therebetween fish-receiving openings 250, 252 and the arms 106, 108 are configured to have end portions 170, 172 overlap a distance 254 and the arms 110, 112 are sized to have the ends 174, 176 overlap a distance 256. The overlapping arms 106, 108 and 110, 112 encircle a fish received in the openings 250, 252 and inhibit release of the fish. Further, by encircling the fish, the arms 106, 108 and 110, 112 contact the fish around the outer periphery of the fish to resist and provide frictional resistance to movement of the fish. As noted above, the distances 254, 256 may vary depending on the size of the fish received in the openings 250, 252. This permits the capture lure 100 to capture different types and sizes of fish.

Figure 8:
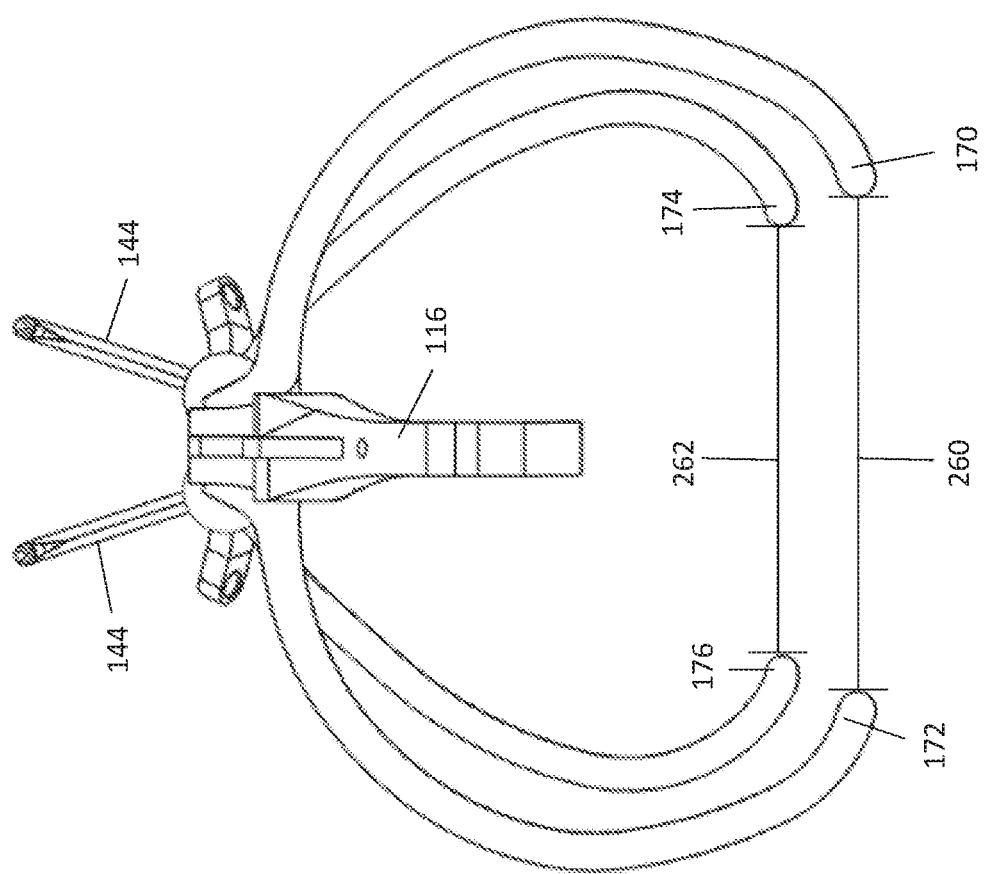
FIG. 8 is a view similar to FIG. 7 showing hooks of the capture lure urged together which causes the ends of the arms to pivot apart.

With reference to FIG. 8, once the user has urged the hooks 144 together in directions 146, 148, the arms 106, 108 and 110, 112 have likewise pivoted in directions 146, 148 and the arm end portions 170, 172 and 174, 176 are separated by distances 260, 262. The distances 260, 262 are sufficient to permit the capture lure 100 to be advanced downward onto a fish.

Figure 9:
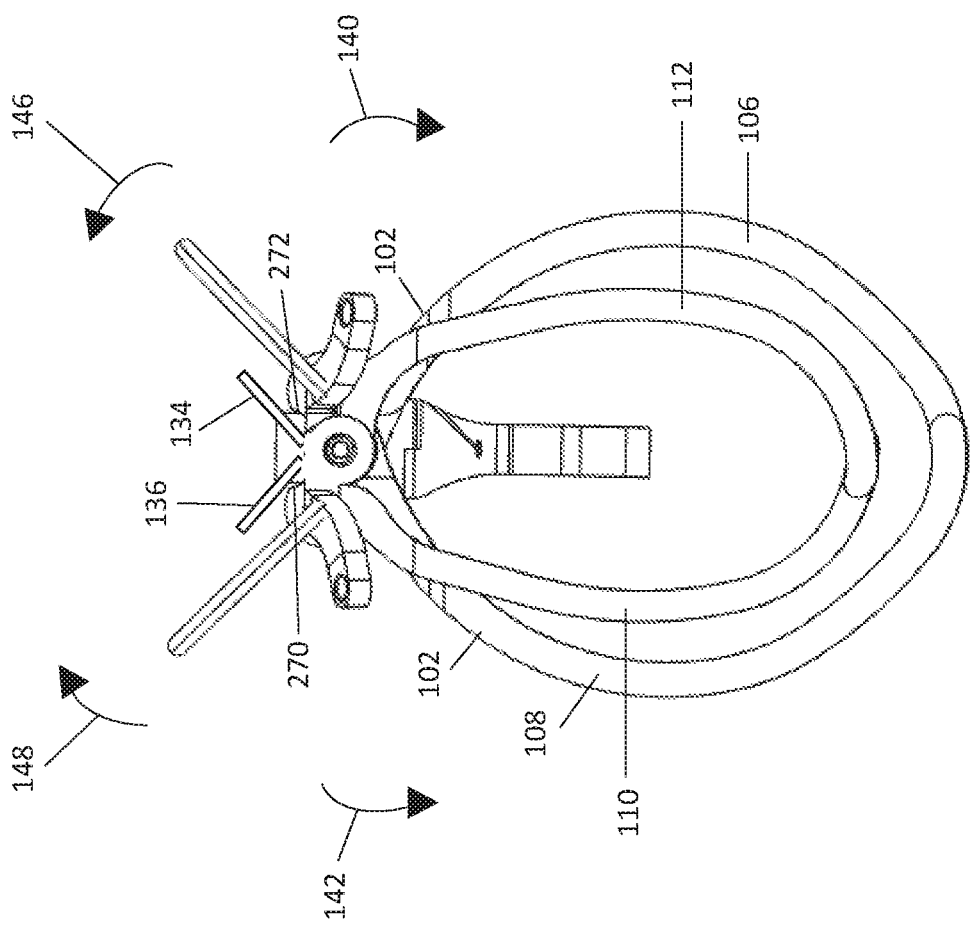
FIG. 9 is a rear elevational view showing a rear hinge connection of the capture lure when the arms are in the closed configuration.
Figure 10:
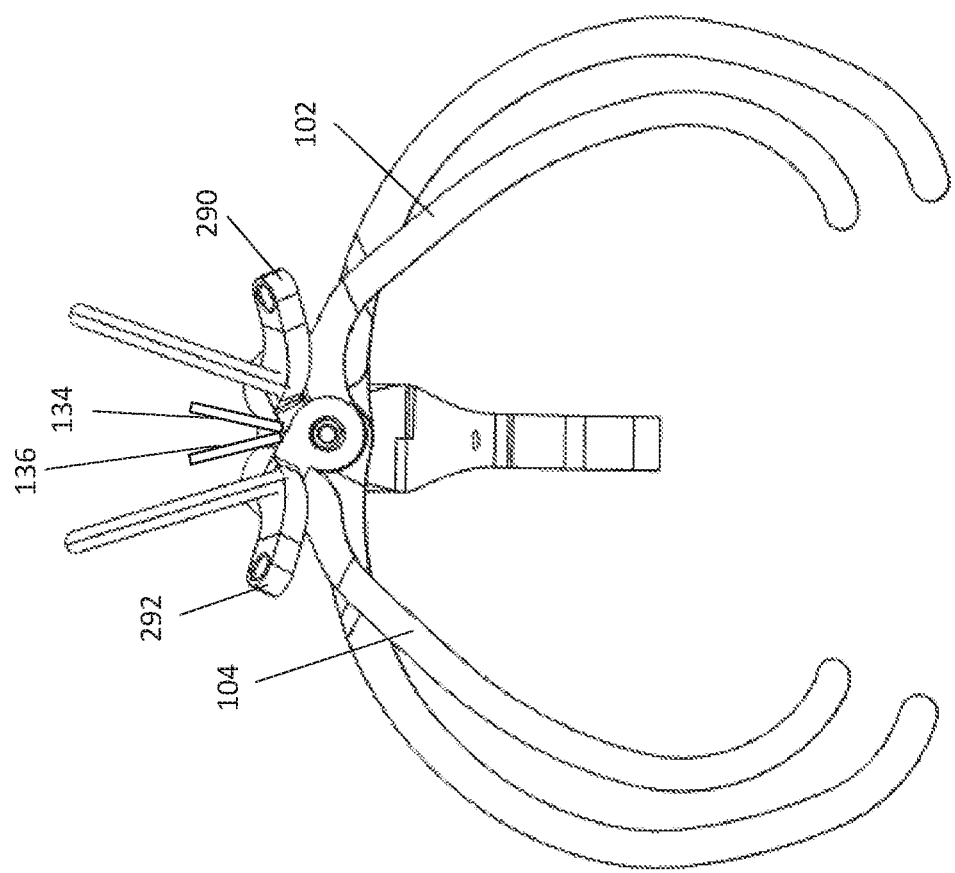
FIG. 10 is a view similar to FIG. 9 showing the rear hinge connection when the arms are in the open configuration.

With reference to FIGS. 9 and 10, the capture lure 100 is shown in the closed configuration (FIG. 9) and the open configuration (FIG. 10). FIGS. 9 and 11 show that the spring legs 136, 134 rest on outer surfaces 270, 272 of the capture bodies 102, 104. The spring 132 may be a torsion spring, such as a metallic torsion spring, and resists the spring legs 136, 134 being moved towards each other in directions 146, 148. When the user moves the hooks 144 together in directions 146, 148, the turns of the spring 132 bias the spring legs 134, 136 against the capture body surfaces 270, 272 and urge the capture bodies 102, 104 in directions 140, 142. In this manner, the spring 132 automatically returns the capture bodies 102, 104 and arms 106, 108 and 110, 112 thereof back to closed configuration once the user releases the hooks 144.

With reference to FIG. 10, the capture bodies 102, 104 may include accessory receiving portions that each include one or more eyelets 290, 292. The eyelets 290, 292 are sized to receive secondary fishing hooks (see, e.g., secondary hook 16 in FIG. 1) and/or spinner attractant elements. The secondary hooks and/or spinner attractant elements may enhance the ability of the capture lure 100 to attract and hook predator game fish.

The retainer 116, connector 114 and capture bodies 102, 104 are connected together to transfer loading directly between the components rather than transferring the loading in an indirect manner through fasteners. This makes the capture lure 100 stronger and able to withstand the loads applied to the capture lure 100 from a fishing line, the weight of the bait fish captured in the capture lure 100, and the weight and resistance provided by a predator game fish which has become hooked on the hooks 144.

Figure 12:
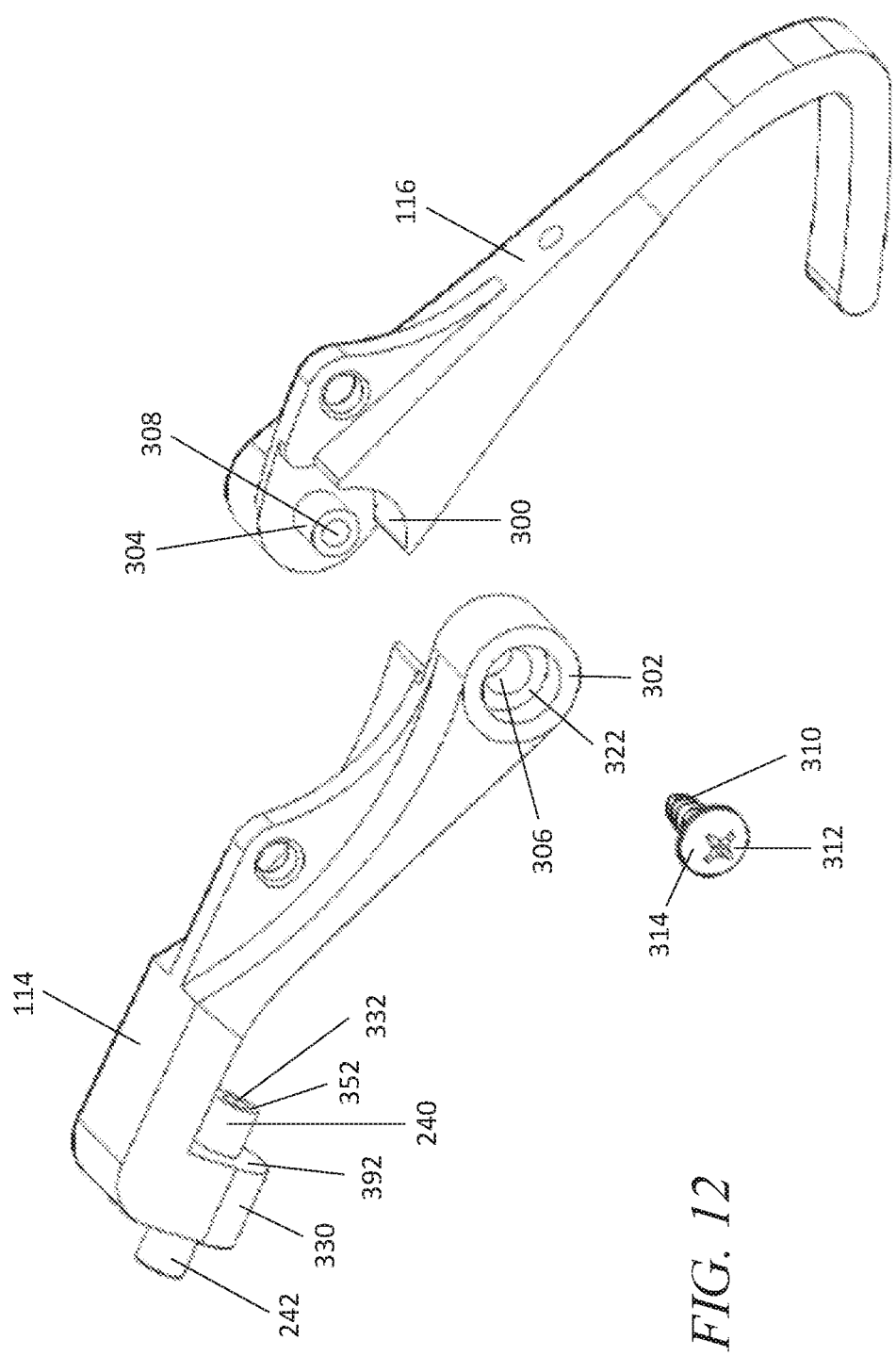
FIG. 12 is an exploded view of the retainer and a connecter of the capture lure of FIG. 11.

More specifically and with reference to FIG. 12, the retainer 116 includes a recess 300 that receives a portion of a sleeve 302 of the connector 114. The retainer 116 has a boss 304 sized to fit through an opening 306 of the sleeve 304. The boss 304 has a threaded opening 308 that receives a threaded shank 310 of a fastener 312. The fastener 312 includes a head 314 with a rotary drive structure, such as a Phillips recess, and secures the connector 114 and retainer 116 together.

Figure 14:
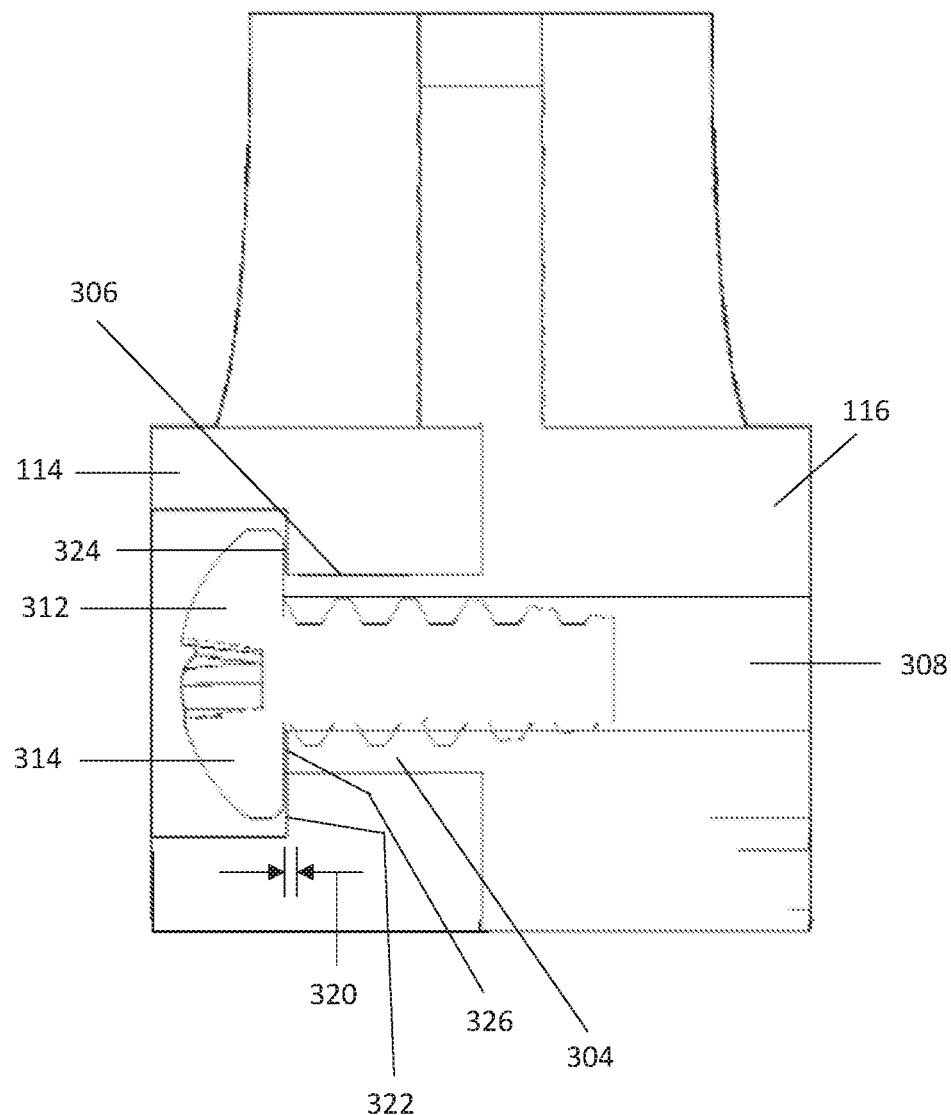
FIG. 14 is a cross-sectional view taken across line 14-14 in FIG. 6 showing a hinge connection between the connector and the retainer of the capture lure.

Turning to FIG. 14, when the connector 114 and retainer 116 are connected, the boss 304 extends through the opening 306 and extends a distance 320 proud of an annular surface 322 of the connector 114 extending around the opening 306. In this manner, when the fastener 312 is tightened down, the head 314 has a lower surface 324 that engages a seat 326 of the boss 304. The distance 320 provides a clearance between the head lower surface 324 and the annular surface 322. In this manner, although the fastener 312 may be tightly fastened to capture the sleeve 302 in constrained relation about the boss 304, the sleeve 302 and the retainer 116 may still pivot relative to the connector 114.

Figure 13:
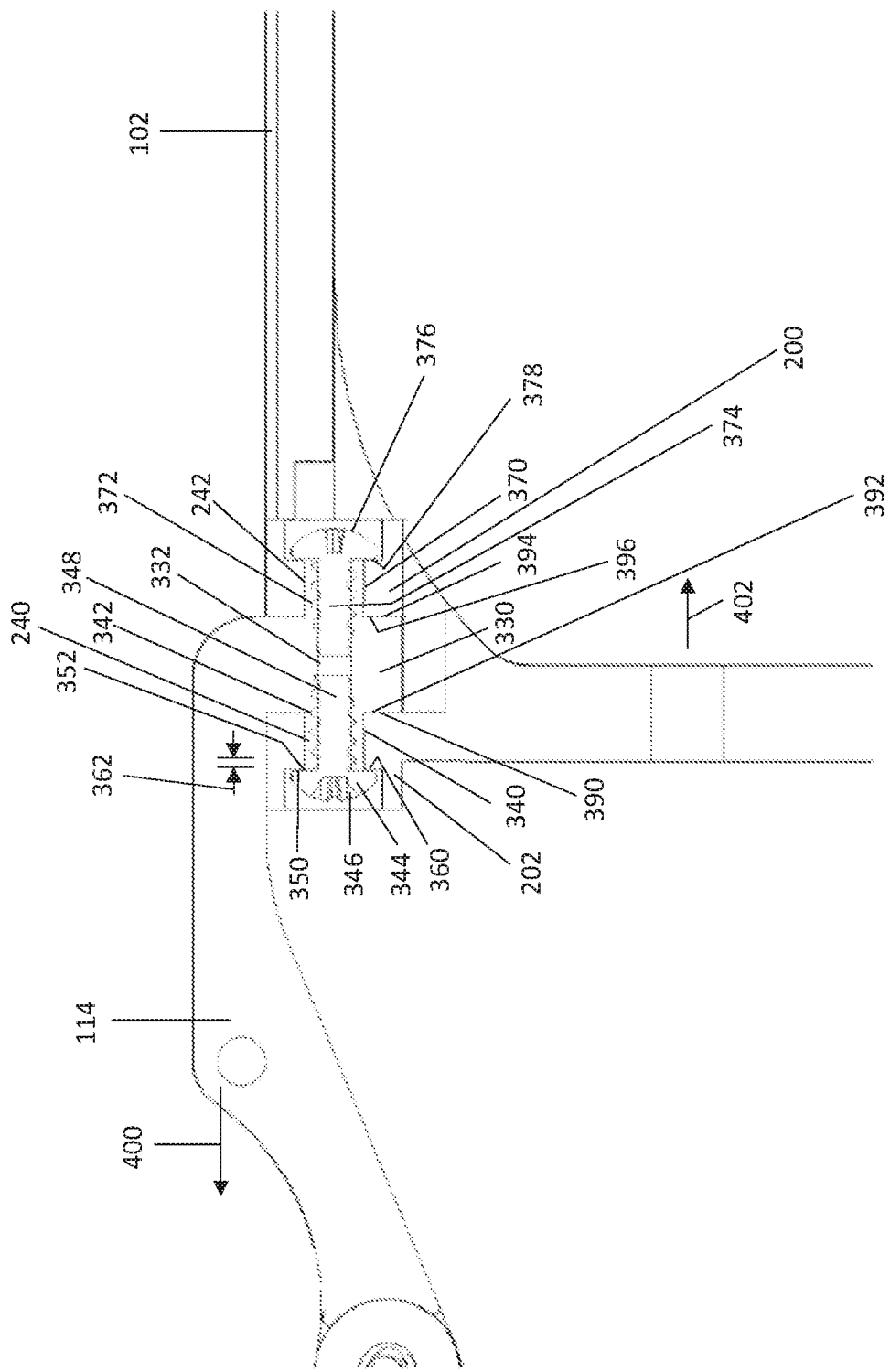
FIG. 13 is a cross-sectional view taken across line 13-13 in FIG. 6 showing a front hinge connection of the capture lure.

With reference to FIGS. 12 and 13, the connector 114 includes a loop 330 having the bosses 240, 242 of the connector 114 extending axially in opposite directions therefrom. The connector 114 includes a through bore 332 extending through the bosses 240, 242 and the loop 330. With reference to FIG. 13, the loop 330 of the connector 114 is sandwiched between the loop 202 of the capture body 102 and the loop 200 of the capture body 104. The loop 202 includes a through opening 340 through which the boss 240 extends. The boss 240 has threads 342 that extend along the through bore 322. The fastener 344 connects the capture body 102 to the connector 114. In one form, the fastener 344 has a head 346, a threaded shank 348 that engages threads 342, and a head lower surface 350 that engages a seat 352 of the boss 240. Like the boss 304 discussed above, the boss 240 extends proud of an annular surface 360 of the loop 202 extending about the through opening 340. The boss 240 extends proud a distance 362 such that the capture body 102 may pivot relative to the connector 114 despite the fastener 344 being tightened down and the head 346 of the fastener 344 capturing the loop 202 on the boss 240.

The loop 200 has a through opening 370 that receives the boss 242 of the connector 114. Like the boss 240, the boss 242 includes threads 372 that engage a threaded shank 374 of a fastener 376. The boss 242 extends proud of an annular surface 378 of the loop 200 so that the fastener 376 captures the loop 200 on the boss 242 while permitting the capture body 104 to pivot relative to the connector 114.

The loop 202 has an annular surface 390 abutting a surface 392 of the loop 330 and the loop 200 has an annular surface 394 abutting a surface 396 of the loop 330. In this manner the loops 200, 202, 330 are in an abutting relation and may transfer loading directly from one loop to another. For example, a fishing line may apply a force in direction 400 on the eyelet 152 and a predator game fish caught on the hook 144 may apply a force in direction 402. The weight of the predator game fish will act in part in direction 402 on the loop 202 and urge the surface 390 tightly against the surface 392 of the loop 330 thereby transferring the weight of the fish from the capture body 102 directly to the connector 114.

Figure 15:
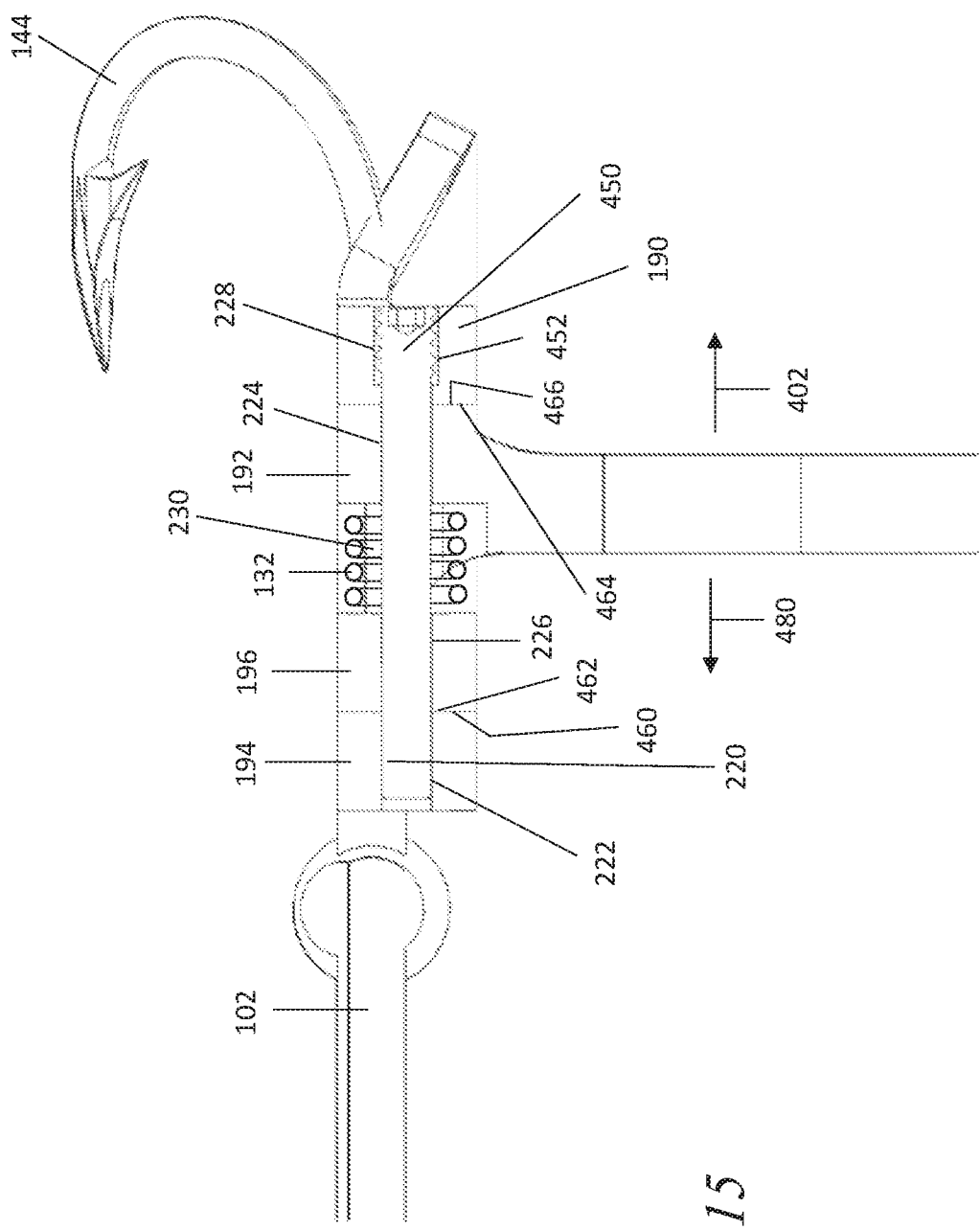
FIG. 15 is a cross-sectional view taken across line 15-15 in FIG. 6 showing the rear hinge connection of the fishing lure.

With reference to FIG. 15, the rear hinge connection 124 includes the hinge pin 220 extending through openings 222, 226, 224, 228 of the loops 190, 192 194, 196. The hinge pin 220 includes a threaded portion 450 that engages threads 452 of the loop 190. With the threaded portion 450 tightened into engagement with the threads 452, the hinge pin 220 is generally stationary relative to the loops 190, 194 of the capture body 104, but the loops 192, 196 may pivot about the hinge pin 220. The hinge pin 220 also extends through an interior opening 230 of the spring 132.

Like the front hinge connection 126, the rear hinge connection 124 permits loading to transmit directly between the capture bodies 102, 104. The loops 194, 196 have abutting annular surfaces 460, 462 and the loops 190, 192 have abutting surfaces 464, 466. For example, if a predator game fish has been hooked on the hook 144 fixed to the clamping body 104 it generally applies a force in direction 402 on the hook 144 of the clamping body 104, the loop 194 of the clamping body 104 will press the surface 460 against surface 462 in direction 402 to transfer this load to the capture body 102 which, in turn, causes the loop 202 to urge the surface 390 thereof against the surface 330 of the connector 114. This transfers loading from the capture body 104 directly to the capture body 102, which in turn directly transfers loading from the capture body 102 to the connector 114. The connector 114 directly transfers loading to the retainer 116 via the engagement between the boss 304 and sleeve 302 discussed above with respect to FIGS. 12 and 14. As another example, if loading is applied to the hook 144 fixed to the capture body 102 is in direction 480, this urges the surface 466 of the loop 190 against the surface 464 of the loop 192. The capture body 104 then urges the surface 394 of the loop 200 against the surface 396 of the loop 330 of the connector 114.

Figure 16:
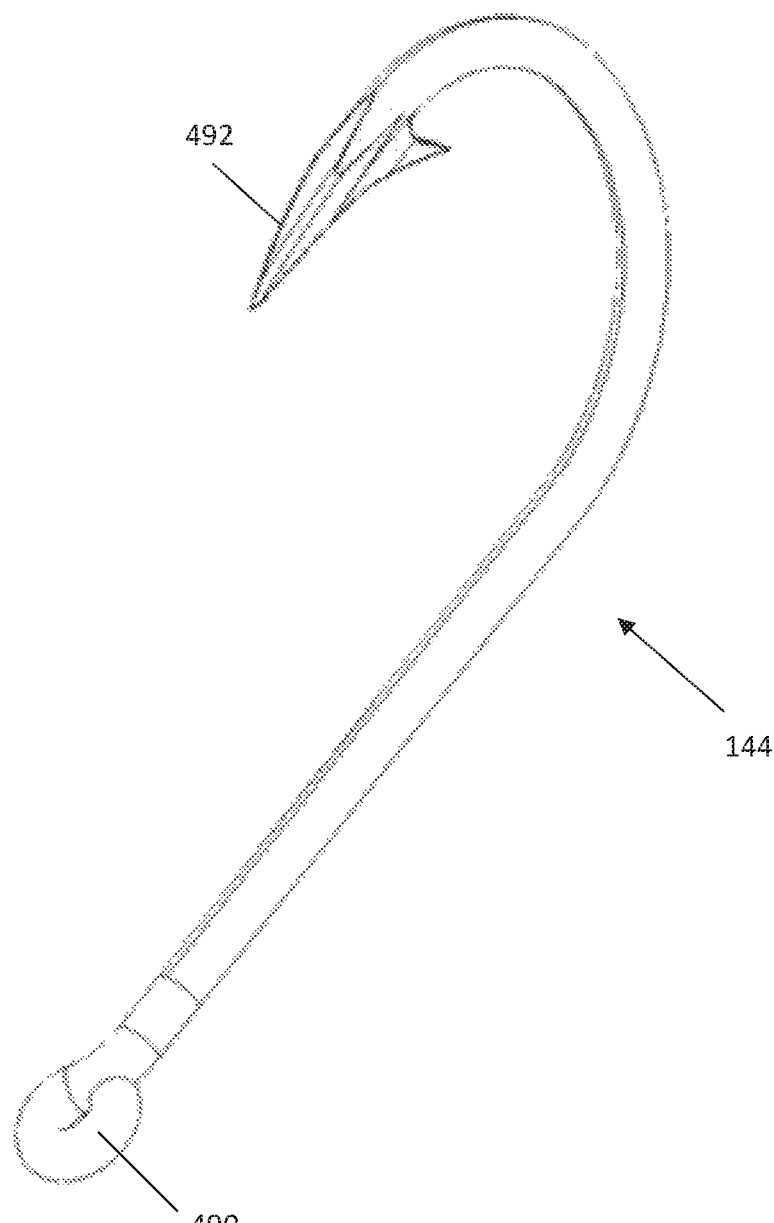
FIG. 16 is a perspective view of one of the fish hooks of the capture lure of FIG. 13 showing a base of the hook that is molded into one of the capture bodies of the capture lure.

Regarding FIGS. 5 and 16, the hooks 144 may be fixed to the clamping bodies 102, 104 in a number of approaches. In one approach, the clamping bodies 102, 104, connector 114, and retainer 116 are each made of an injection-molded plastic, such as nylon or polycarbonite. Each hook 144 may have a base 490, such as a loop, that is molded or otherwise joined with the material of the capture bodies 102, 104 during manufacture of the capture bodies 102, 104. With reference to FIG. 5, the base 490 is shown molded into a hook securement portion 492 of the capture body 102. The hook 144 includes one or more points 492 that have a desired configuration. In another embodiment, the clamping bodies 102, 104 are made of a metallic material and the hooks 114 are welded or secured with fasteners to the clamping bodies 102, 104.

Figure 17:
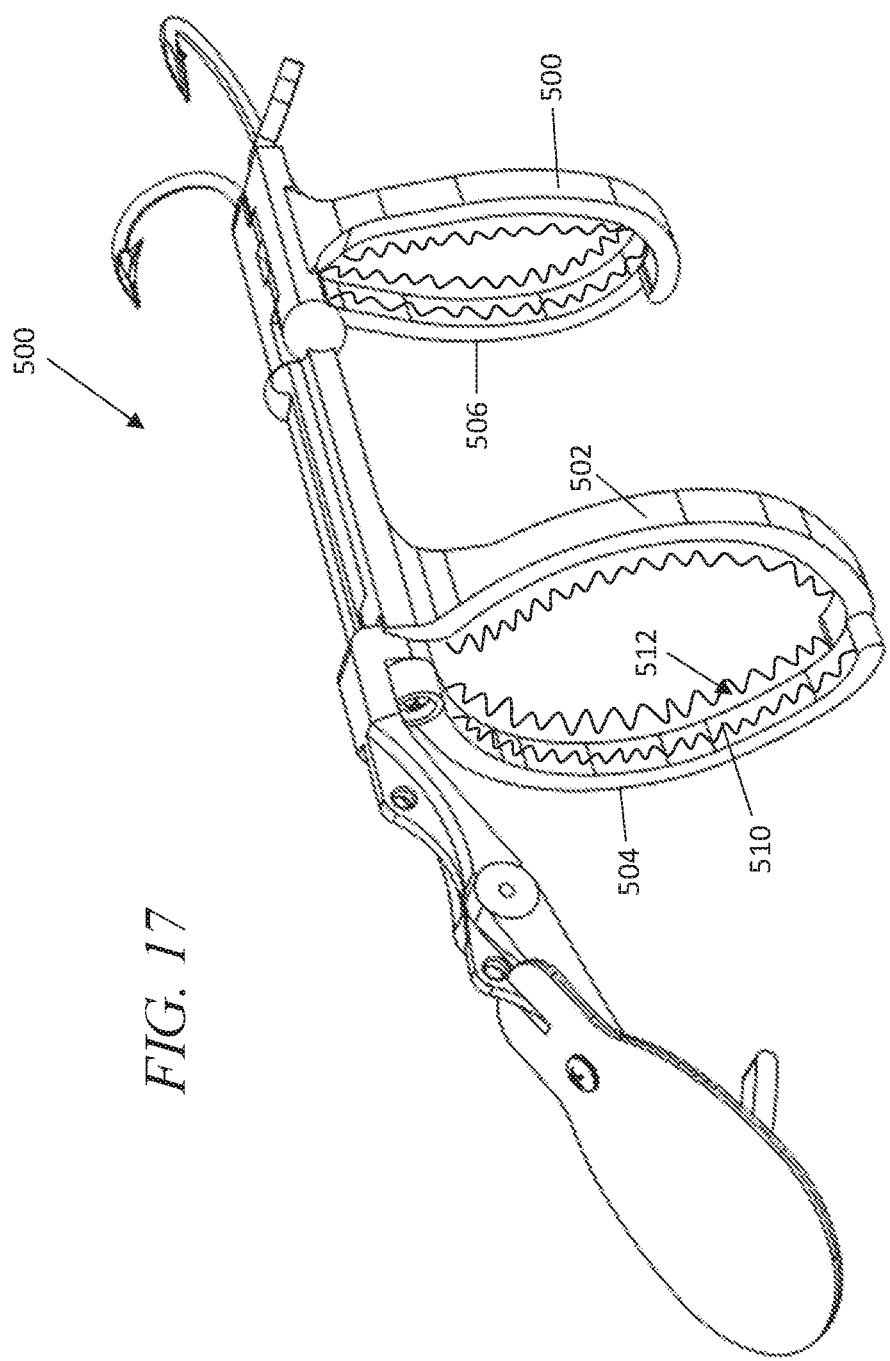
FIG. 17 is a perspective view of a capture lure having arms with scalloped edges to grip a fish.

With reference to FIG. 17, another capture lure 500 is shown that is similar in many respects to the capture lure 100 discussed above. The capture lure 100 includes arms 502, 504, 506, 508 that have a scalloped inner surface 510. The scalloped inner surface 510 provides peaks 512 that concentrate the clamping force from the arms 502, 504, 506, 508 at spaced areas around the fish's body. These localized pressure points provide enhanced resistance to movement of the fish relative to the arms 502, 504 and 506, 508.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A fishing lure comprising:
a body having an opening to receive a fish;
the body including an assembly of a first capture body, a second capture body, and at least one pivot member, wherein the at least one pivot member pivotally connects the first and second capture bodies;
the first and second capture bodies each having at least one capture portion;
the first and second capture bodies pivotal between an open configuration wherein the capture portions are spaced apart and permit the fish to be positioned in the opening of the body and a closed configuration wherein the capture portions are closer together and capture the fish in the opening of the body;
a biasing member urging the first and second capture bodies toward the closed configuration;
a first hook of the first capture body and a second hook of the second capture body, the first and second hooks having a first distance apart with the first and second capture bodies in the closed configuration and a second distance apart less than the first distance with the first and second capture bodies in the open configuration;
an arm extending from the body, the arm having a proximal portion and a distal portion relative to the body, the distal portion being adjustably connected to the proximal portion;
a bit extending from the distal portion to be positioned in a mouth of a fish captured in the opening of the body, a location of the bit relative to the opening being adjustable by adjusting the distal portion relative to the proximal portion such that the bit has at least a first position and a second position, the first position being closer to the opening than the second position.

2. The fishing lure of claim 1 further comprising a bill extending away from the opening, the bill being adjustably attached to the arm with a first extended position and a second extended position, and the second extended position being further from the opening than the first extended position.

3. The fishing lure of claim 2 wherein the arm including includes at least one eyelet.

4. The fishing lure of claim 1 wherein the capture bodies each include at least one arm and the arms of the capture bodies include the capture portions.

5. The fishing lure of claim 4 wherein the capture bodies each include two arms.

6. The fishing lure of claim 1 wherein the first and second capture bodies include interlaced loops and the at least one pivot member extends through the loops.

7. The fishing lure of claim 1 wherein the body includes two pairs of arms that include the capture portions and the opening includes a pair of openings that are each defined by one of the pairs of arms.

8. A fishing lure comprising:
a body comprising an assembly of a first capture body, a second capture body, and a connector, wherein the first and second capture bodies are pivotally connected to the connector and pivotal about a pivot axis between closed and open configurations;
at least one hook connected to the body;
a pair of harness portions of the first and second capture bodies;
the connector extending forward of the harness portions;
a fishing line connecting portion of the connector; and
the connector engaging at least one of the first capture body and the second capture body when transferring a fishing line load from the connector to the at least one of the first and second capture bodies; and
the connector having a single piece structure including a first pivot pin extending from the connector along the pivot axis in a first direction and a first confronting surface surrounding at least a portion of the first pivot pin, a second pivot pin extending from the connector along the pivot axis in a second direction, and a second confronting surface surrounding at least a portion of the second pivot pin;
the first capture body having a third confronting surface facing the first confronting surface of the connector; and
the second capture body having a fourth confronting surface facing the second confronting surface of the connector.

9. The fishing lure of claim 8 wherein the body includes a slot configured to receive a dorsal fin of the fish.

10. The fishing lure of claim 8 wherein the body includes a biasing member configured to urge the first and second capture bodies together and hold the fish therebetween.

11. The fishing lure of claim 8 wherein the body includes a retainer that includes the bit, and a hinge connection between the connector and the retainer that permits adjustment of the orientation of the retainer and bit thereof relative to the connector.

12. The fishing lure of claim 8 wherein the connector includes a mounting portion extending around the pivot axis.

13. The fishing lure of claim 8 wherein the body includes a bill extending forwardly of the bit.

14. A method of preparing a fishing lure, the method comprising:
urging together first and second fish hooks of first and second capture bodies of the fishing lure against a bias of a biasing member of the fishing lure to pivot the first and second capture bodies from a closed configuration wherein the first and second capture bodies have capture portions that are closer together to an open configuration wherein the capture portions are farther apart;
positioning a fish between the capture portions of the fishing capture lure with the first and second capture bodies in the open configuration;
releasing the first and second fish hooks to permit the biasing member of the fishing lure to urge the first and second capture bodies toward the closed configuration wherein the capture portions resist release of the fish from the fishing capture lure; and
positioning a bit extending from a distal portion of an arm extending from the first and second capture bodies, the distal portion of the arm being adjustably connected to the proximal portion, the bit having at least a first position and a second position, the first position being closer to the first and second capture bodies than the second position.

15. The method of claim 14 wherein releasing the first and second fish hooks to permit the biasing member of the fishing lure to urge the first and second capture bodies toward the closed configuration includes positioning arms of the capture portions behind pectoral fins of the fish.

16. The method of claim 14 wherein releasing the first and second fish hooks to permit the biasing member of the fishing lure to urge the first and second capture bodies toward the closed configuration includes pivoting the capture portions together from the open position to the closed position.

17. The fishing lure of claim 8 further comprising a fastener connecting the connector and the at least one of the first capture body and the second capture body.

* * * * *